(12) United States Patent
Anderson (10) Patent No.: US 7,902,817 B2
(45) Date of Patent: Mar. 8, 2011

(54) ELECTROMAGNETIC TRACKING METHOD AND SYSTEM

(75) Inventor: Peter Traneus Anderson, Andover, MA (US)

(73) Assignee: General Electric Company, Schenectady, NY (US)

( * ) Notice: Subject to any disclaimer, the term of this patent is extended or adjusted under 35 U.S.C. 154(b) by 937 days.

(21) Appl. No.: 11/728,452

(22) Filed: Mar. 26, 2007

(65) Prior Publication Data

US 2008/0238413 A1    Oct. 2, 2008

(51) Int. Cl.
G01B 7/14    (2006.01)
(52) U.S. Cl. ............................. 324/207.17; 324/207.15
(58) Field of Classification Search ............ 324/207.11, 324/207.15, 207.17, 256–260; 336/65
See application file for complete search history.

(56) References Cited

U.S. PATENT DOCUMENTS

| | | |
|---|---|---|
| 1,450,080 A | 3/1923 | Hazeltine |
| 4,710,708 A | 12/1987 | Rorden |
| 4,849,692 A | 7/1989 | Blood |
| 4,945,305 A | 7/1990 | Blood |
| 5,425,382 A | 6/1995 | Golden |
| 5,523,682 A * | 6/1996 | Leon ................. 324/207.17 |
| 5,544,532 A * | 8/1996 | Brown ................. 73/861.16 |
| 5,558,091 A | 9/1996 | Acker |
| 5,592,939 A | 1/1997 | Martinelli |
| 5,640,170 A | 6/1997 | Anderson |
| 5,646,524 A | 7/1997 | Gilboa |
| 5,646,525 A | 7/1997 | Gilboa |
| 5,676,673 A | 10/1997 | Ferre |
| 5,747,996 A | 5/1998 | Fuchs |
| 5,782,765 A | 7/1998 | Jonkman |
| 5,800,352 A | 9/1998 | Ferre |
| 5,803,089 A | 9/1998 | Ferre |
| 5,829,444 A | 11/1998 | Ferre |

(Continued)

FOREIGN PATENT DOCUMENTS

WO    WO9736192    10/1997

OTHER PUBLICATIONS

Takaaki Nara, et al.; "A Closed-Form Formula for Magnetic Dipole Localization by Measurement of Its Magnetic Field and Spatial Gradients"; Digital Object Identifier; 2006 IEEE; pp. 3291-3293.

(Continued)

*Primary Examiner* — Bot L LeDynh
(74) *Attorney, Agent, or Firm* — Fletcher Yoder P.C.

(57) ABSTRACT

Provided is an electromagnetic tracking system, comprising a coil arrangement comprising a first coil configured to generate a first magnetic field and a second coil configured to generate a second magnetic field and a drive unit configured to provide a first drive current to the first coil and to provide a second drive current to the second coil, wherein the first drive current and the second drive current are at about the same frequency, wherein the frequency is below 60 Hz, and wherein the first electromagnetic field and the second magnetic field are generated out of phase. Also provided is a method of electromagnetic tracking comprising generating a first electromagnetic field at a frequency, generating a second electromagnetic field at about the frequency, wherein the frequency is below 60 Hz and wherein the first electromagnetic field and the second magnetic field are generated out of phase, sensing the first electromagnetic field and the second electromagnetic field and processing a waveform indicative of a combination of the sensed first electromagnetic field and the sensed second electromagnetic field.

16 Claims, 5 Drawing Sheets

U.S. PATENT DOCUMENTS

| | | |
|---|---|---|
| 5,873,822 A | 2/1999 | Ferre |
| 5,913,820 A | 6/1999 | Bladen |
| 5,967,980 A | 10/1999 | Ferre |
| 6,052,610 A | 4/2000 | Koch |
| 6,073,043 A | 6/2000 | Schneider |
| 6,129,668 A | 10/2000 | Haynor |
| 6,172,499 B1 | 1/2001 | Ashe |
| 6,175,756 B1 | 1/2001 | Ferre |
| 6,201,387 B1 | 3/2001 | Govari |
| 6,226,547 B1 | 5/2001 | Lockhart |
| 6,246,231 B1 | 6/2001 | Ashe |
| 6,374,134 B1 | 4/2002 | Bladen |
| 6,445,943 B1 | 9/2002 | Ferre |
| 6,502,031 B2 | 12/2002 | Uehara |
| 6,539,327 B1 | 3/2003 | Dassot |
| 6,701,179 B1 | 3/2004 | Martinelli |
| 6,774,624 B2 | 8/2004 | Anderson |
| 6,980,921 B2 | 12/2005 | Anderson |
| 7,015,859 B2 | 3/2006 | Anderson |
| 7,096,148 B2 | 8/2006 | Anderson |
| 7,158,754 B2 | 1/2007 | Anderson |
| 2002/0077537 A1* | 6/2002 | Avrin et al. .................. 600/409 |
| 2006/0058604 A1 | 3/2006 | Avinash |
| 2006/0106292 A1 | 5/2006 | Anderson |
| 2006/0247511 A1 | 11/2006 | Anderson |

OTHER PUBLICATIONS

U.S. Appl. No. 11/654,880, filed Jan. 18, 2007.
U.S. Appl. No. 11/654,878, filed Jan. 18, 2007.

* cited by examiner

ELECTROMAGNETIC TRACKING METHOD AND SYSTEM

BACKGROUND

This disclosure relates generally to tracking systems that use magnetic fields to determine the position and orientation of an object, such as systems used for tracking instruments and devices during surgical interventions and other medical procedures. More particularly, this disclosure relates to a system and method of tracking including a coil transmitter having two coils operating at about the same frequency.

Tracking systems have been used in various industries and applications to provide position information relating to objects. For example, electromagnetic tracking may be useful in aviation applications, motion sensing applications, and medical applications. In medical applications, tracking systems have been used to provide an operator (e.g., a physician) with information to assist in the precise and rapid positioning of a medical device located in or near a patient's body. In general, an image may be displayed on a monitor to provide positioning information to an operator. The image may include a visualization of the patient's anatomy with an icon on the image representing the device. As the device is positioned with respect to the patient's body, the displayed image is updated to reflect the correct device coordinates. The base image of the patient's anatomy may be generated either prior to, or during, the medical procedure. For example, any suitable medical imaging technique, such as X-ray, computed tomography (CT), magnetic resonance imaging (MRI), positron emission tomography (PET), and ultrasound, may be utilized to provide the base image displayed during tracking. The combination of the base image and the representation of the tracked device provide positioning information that allows a medical practitioner to manipulate a device to a desired position and/or associate information gathered to a precise location.

To determine device location, tracking systems may utilize a method of electromagnetic (EM) field generation and detection. Using this method, at least one magnetic field is generated from one or more EM sensors (e.g., EM field generators or transmitters), and the magnetic fields are detected by one or more complementary EM sensors (e.g., EM receivers). In such a system the EM field may be detected by measuring the mutual inductance between the EM sensors and the complementary EM sensors. The measured values may then be processed to resolve a position and/or orientation of the EM sensors relative to one another. For example, an electromagnetic tracking system may include an EM sensor mounted at the operative end of a device and a complementary EM sensor fixed in a known position. When the EM sensor generates a magnetic field, a voltage indicative of the mutual inductance may be induced across the complementary EM sensor. The signal may be sensed and transmitted to a processor for processing. Processing may then use the measured voltage signal indicative of mutual inductance to determine the position and orientation of the EM sensors relative to one another (e.g., the X, Y and Z coordinates, as well as the roll, pitch and yaw angles).

Generally electromagnetic tracking systems contain EM sensors that include an array of one or more EM transmitter coils and an array of one or more EM receiver coils. Preferably, the mutual inductance between the two coils may be measured without inaccuracies. However, when measuring the mutual inductance between the transmitter and receiver coils, electrically conductive materials in the vicinity of the transmitters and receivers may distort the electromagnetic fields generated by the transmitter. For example, a nearby metal instrument may create distortions in the magnetic field. These distortions may lead to inaccuracies in tracking position and orientation.

As an additional consideration, electromagnetic tracking systems may be limited by the number of degrees of freedom they are able to track. In general, the number of degrees of freedom that an electromagnetic tracking system is able to track and resolve depends on the number of receiving and transmitting coils in the system. For example, a system consisting of a single transmitting coil and multiple receiver coils may be tracked in only five degrees of freedom. As will be appreciated, this is because a dipole coil is uniform about its axis and, therefore, processing cannot resolve the rotational orientation of the coil transmitter.

Accordingly, there is a desire to provide an electromagnetic field tracking system, wherein EM sensors are configured to limit the impact of magnetic field distortions. There is also a desire to provide a system configured to track in six degrees of freedom.

BRIEF DESCRIPTION

In accordance with an aspect, provided is an electromagnetic tracking system, comprising a coil arrangement comprising a first coil configured to generate a first magnetic field and a second coil configured to generate a second magnetic field and a drive unit configured to provide a first drive current to the first coil and to provide a second drive current to the second coil, wherein the first drive current and the second drive current are at about the same frequency, wherein the frequency is below 60 Hz, and wherein the first electromagnetic field and the second magnetic field are generated out of phase.

In accordance with another aspect, provided is a method for electromagnetic tracking, comprising driving a first current across a first coil to generate a first magnetic field, driving a second current across a second coil to generate a second magnetic field, wherein the first magnetic field and the second magnetic field are at about same frequency, wherein the frequency is below 60 Hz, and wherein the first magnetic field is out of phase with the second magnetic field, sensing the first magnetic field and the second magnetic field with at least one electromagnetic receiver and processing the sensed first magnetic field and the sensed second magnetic field.

In accordance with yet another aspect, provided is a method of electromagnetic tracking comprising generating a first electromagnetic field at a frequency, generating a second electromagnetic field at about the frequency, wherein the frequency is below 60 Hz and wherein the first electromagnetic field and the second magnetic field are generated out of phase, sensing the first electromagnetic field and the second electromagnetic field and processing a waveform indicative of a combination of the sensed first electromagnetic field and the sensed second electromagnetic field.

DRAWINGS

These and other features, aspects, and advantages will become better understood when the following detailed description is read with reference to the accompanying drawings in which like characters represent like parts throughout the drawings, wherein.

DETAILED DESCRIPTION

Figure 1:
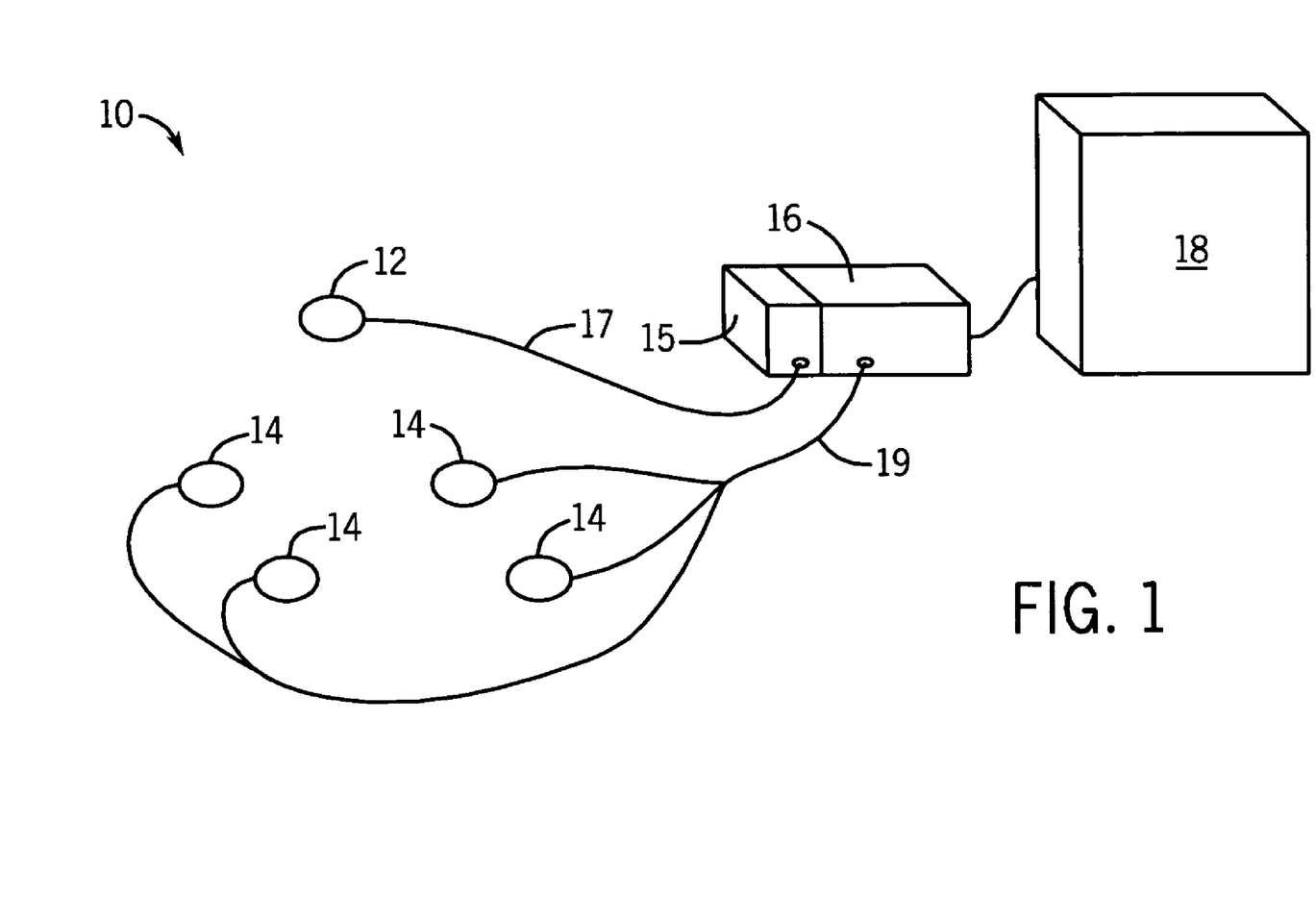
FIG. 1 is an illustration of an exemplary system for EM tracking implementing certain aspects of the present technique.

Referring now to FIG. 1, a tracking system 10 in accordance with an embodiment of the present technique is illustrated. The tracking system 10 may generally include multiple tracking components. As depicted, the tracking components may include a transmitter 12, at least one receiver 14, a drive unit 15, a processor 16 and a user interface 18.

In the tracking system 10, the transmitter 12 may include a conductive coil that provides an electromagnetic field when a current is passed across the coil. In certain embodiments, the transmitter 12 may include a single dipole coil. For example, the transmitter 12 may include a single dipole coil that is about 8 mm long and about 1.7 mm in diameter, with 7700 turns of American Wire Gauge (AWG) wire formed around a ferromagnetic core that is about 8 mm long and about 0.5 mm in diameter. When a current is provided across a single dipole coil, a single magnetic field may be generated with a magnitude moment vector along its "axis." Those of ordinary skill in the art will appreciate that multiple transmitting coils may be used in coordination to generate multiple magnetic fields. For example, the transmitter 12 may be formed from three co-located orthogonal quasi-dipole coils (i.e., a coil-trio). When a coil-trio is energized, each coil may generate a magnetic field. As a result, three magnetic fields may be generated with magnitude vectors that are co-located and orthogonal to one another.

Complementary to the transmitter 12, the system 10 may also include at least one receiver 14 that is configured to "receive" (i.e., sense) the magnetic field(s) generated by the transmitter 12. When a current is applied to the transmitter 12, the magnetic field generated by a coil of the transmitter 12 may induce a voltage into a coil of each of the at least one receiver 14. The induced voltage may be indicative of the mutual inductance between the two coils. Thus, the induced voltage across the coil of each of the at least one receiver 14 may be sensed and processed to determine the mutual inductance (Lm) between the transmitter 12 and each of the at least one receiver 14.

Similar to the transmitter 12, the at least one receiver 14 may employ a single dipole coil or multiple coils (e.g., a coil trio). For example, the system 10 may include an electromagnetic tracking system configured with industry-standard coil architecture (ISCA). ISCA type coils are defined as three approximately collocated, approximately orthogonal, and approximately dipole coils. An ISCA configuration includes a three-axis dipole coil transmitter and a three-axis dipole coil at least one receiver 14. In such a configuration, the coils of the transmitter 12 and the coils of the at least one receiver 14 are configured such that the three coils exhibit the same effective area, are oriented orthogonally one another, and are centered at the same point. Using this configuration, nine parameter measurements may be obtained (i.e., a measurement between each transmitting coil and each receiving coil). From the nine parameter measurements, processing may determine position and orientation information for each coil of the transmitter 12 with respect to each coil of the at least one receiver 14. If either of the transmitter 14 or receivers 12 is in a known position, processing may also resolve position and orientation relative to the known position.

As mentioned previously, the system 10 may further include a drive unit 15. In accordance with certain implementations of the present technique, the drive unit 15 may be configured to provide a drive current via cable 17 to each coil of the transmitter 12. By way of example, a drive current may be supplied by the drive unit 15 to energize a coil of a transmitter 12 and, thereby, generate a magnetic field that is sensed by the at least one receiver 14. The drive current may include a periodic waveform with a given frequency (e.g., a sine wave). In turn, the current across the coil will generate a magnetic field at the same frequency as the drive current. For example, electromagnetic tracking systems generally may be supplied with sine wave current waveforms with frequencies between 8 kHz and 40 kHz and, thus, generate magnetic fields with frequencies between 8 kHz and 40 kHz.

The system 10 further may include a processor 16. In the illustrated embodiment, the magnetic fields sensed by the at least one receiver 14 may be output via cable 19 to the processor 16 for processing. The processor 16 may include, for example, a digital signal processor, a CPU, or the like. The processor may process received signals to track the orientation and position of a device. For example, the at least one receivers 14 will produce output signals that are to the mutual inductance between a transmitter 12 and the at least one receiver 14. The processor 16 may use use ratios of the mutual inductance measurements to triangulate the position of an transmitter 12 relative to the at least one receiver 14. When the fields generated include multiple frequencies, processing may be able to determine the magnetic field frequency from the signal sensed by the at least one receiver 14. Thus, the frequency of a magnetic field may be useful to distinguish magnetic fields when multiple magnetic fields are sensed by a single receiving coil. For example, when driving a transmitter (such as transmitter 12) having a single dipole coil, a single drive current of a given frequency may be sufficient to identify the magnetic field. This is true because only a single transmitting coil is generating a magnetic field. However, when a transmitter (such as transmitter 12) includes multiple coils (e.g., a coil trio), each of the at least one receiver 14 may sense multiple magnetic fields simultaneously. The result may be a single signal from each of the at least one receiver 14 that is transmitted to the processor 16. So that the subsequent processing can more easily identify each of the magnetic fields, the frequency of each of the generated magnetic fields may be varied. By identifying each magnetic field, processing may be able to isolate the signal between each respective transmitting and receiving coil and, thereby, determine the relative position and/or orientation of each of the coils. For example, if each coil of the transmitter 12 is provided a current waveform of a different frequency, processing may identify each magnetic field. Thus, the processor 16 may implement any suitable algorithm(s) to establish the position and orientation of the transmitter 12 relative to the at least one receiver 14. For example, the processor 16 may use the ratios of mutual inductance between each coil of the at least one receiver 14 and each coil of the transmitter 12 to triangulate the position of the coils. The processor 16 may use these relative positions to resolve a position and orientation of the transmitter 12.

As illustrated, system 10 may also include a user interface 18. For example, the system 10 may include a monitor to display the determined position and orientation of a tracked object. As will be appreciated, the user interface 18 may include additional devices to facilitate the exchange of data between the system 10 and the user. For example, the user interface 18 may include a keyboard, mouse, printers or other peripherals. While the processor 16 and the user interface 18 may be separate devices, in certain embodiments, the processor 16 and the user interface 18 may be provided as a single unit.

Although electromagnetic tracking may be employed as described above, other concerns may exist. For example, electrically conductive materials in the vicinity of the transmitter 12 and the at least one receiver 14 may distort the magnetic field. This is because electromagnetic fields may induce eddy currents into conductors, resulting in distortions of the electromagnetic fields. Therefore, the presence of conductive objects may lead to inaccurate magnetic field measurements (e.g., mutual inductance measurements) and, thus, inaccurate tracking. Although some mapping techniques are known to compensate for these distortions, they may not be sufficient or practical in all instances. Therefore, it is desirable to understand the source of these distortions and provide techniques to reduce their effects.

Distortions from conductive objects may be present because eddy currents created in a conductive object prevents a magnetic field from penetrating through the "skin" of the electrically conductive object. For example, the electrically conductive material may be characterized by the material parameter "skin depth". The "skin depth" represents the penetration of the magnetic field into the conductive object. "Skin depth" may be defined as:

$$skindepth = \sqrt{\frac{2}{\omega * \mu * \rho}}$$

where:
$\omega$=angular frequency=$2\pi*F$
F=Frequency
$\mu$=magnetic permeability of the material
$\rho$=electrical resistivity of the material
Thus:

$$skindepth = \sqrt{\frac{1}{F}}\sqrt{\frac{1}{\pi * \mu * \rho}}$$

Accordingly, the skin depth is inversely proportional to the square root of the frequency of the magnetic field. As will be appreciated, as the skin depth increases, distortions to the magnetic field are reduced. Thus, at a lower frequency, the magnetic field will penetrate more of the conductive object, leading to less distortion of the magnetic field.

In light of this phenomenon, the magnetic field frequency may be reduced to increase the skin depth and, thereby, decrease the distortions caused by conductive objects that are near the transmitter 12 and/or the at least one receiver 14. For example, pulsed-DC (called "direct-current") systems may include lower frequency (e.g., 400 Hz) magnetic fields to reduce distortions. However, for highly electrically conductive materials such as copper and aluminum, these frequencies may not be low enough to make the skin depth large compared to the object and, thus, significant distortions remain. Therefore, it may be desirable to generate magnetic fields at even lower frequencies. However, lowering the frequency results in additional concerns. For instance, at frequencies near the power line frequency (50 or 60 Hz) or its harmonics, there may be interference with the magnetic fields generated at low frequencies. For example, the power line may generate a magnetic field at 50 or 60 Hz that induces additional eddy currents into conductive objects. Further, the power line magnetic field may be inadvertently sensed by the at least one receiver 14. Thus, two concerns remain prevalent: distortions due to electrically conductive objects and distortions due to the electromagnetic fields of power lines.

One solution may include generating magnetic fields at frequencies below the power line frequency to increase skin depth and to reduce distortions from the electromagnetic fields of power lines. For example, a magnetic field may be generated at approximately half the utility-power frequency. This permits centering a selective filter at a passband between 0 Hz (direct current D.C.) and the power frequency of 60 Hz. Thus, the interference and distortions caused by the power line may be reduced.

Although lower frequencies provide advantages in reducing distortions, other issues may arise due to the low frequency. For example, one concern includes an increase in the amount of time required to detect and measure the magnetic field. As will be appreciated, when sampling a waveform (e.g., sine wave), samples may be taken over several periods to provide for an accurate representation of the waveform. As the frequency of a waveform is reduced, the period increases and, therefore, the time required to accurately sample the waveform increases. This is also true in sampling the waveform that is sensed by a receiving coil. Therefore, as the frequency of the magnetic field is lowered to resist distortions, the sample time may increase. For example, the transmitter 12 may generate a magnetic field at 25.44 Hz, and the corresponding signal induced across the at least one receiver 14 being measured at a period of 118 ms. Although this may be a suitable rate for some applications, it may still result in slower processing and, thus, slower tracking.

The concern of increased sampling time may be more prevalent as the number of transmitters 12 is increased. This is true because an increased number of samples must be taken at the slower sample rate. Thus, as the number of transmitting coils is increased to generate multiple magnetic fields, the sample time may increase. As will be appreciated (and discussed above), the number of coils and, therefore, the sample time, may be dependent on the number of degrees of freedom to be tracked (e.g., more coils may allow resolution of more degrees of freedom). For example, if a transmitter (such as transmitter 12) having a single coil is used, it may be small enough to be approximated as a dipole coil and, thus, generate a magnetic field that is substantially symmetrical about the axis of the coil. Being symmetrical about an axis may prevent processing from distinguishing the roll orientation about the axis because the magnetic field does not change as the coil rotates. Thus, tracking a single dipole coil does not allow for resolution of all six degrees of freedom. If only five degrees of freedom are needed, the single coil and the corresponding sample rate of the single waveform may be used. However, if six degrees of freedom are desired, the transmitter 12 may include a second coil with an orientation that is different from the first transmitter coil. In such a configuration, the "roll" of the transmitter 12 may be tracked. As discussed above, this may be accomplished by driving each coil with current waveforms of differing frequencies. When a second coil is added to the transmitter 12, the measurement time increases significantly, as a second frequency must also be sensed and processed. Thus, tracking multiple coils of a transmitter 12 that is being driven at a low frequency may reduce electromagnetic distortions from conductive objects, but lead to unacceptably long measurement times.

In light of the above considerations and concerns, a system is needed that reduces the effects of distortions, can provide tracking in all six degrees of freedom, and has reduced measurement times. Provided is a system that includes a two-coil transmitter in an arrangement that allows that allows tracking in all six degrees of freedom. Further provided is a system in which the two coils operate at the same low frequency to reduce sampling rates. Such a system provides for tracking that is resistant to distortions, can be tracked in all six degrees of freedom, and has reduced measurement times.

To reduce the effects of magnetic field distorting objects, an embodiment may include the transmitter 14 generating magnetic fields that are at about the same low frequency. In addition, the system 10 may generate the magnetic fields below 60 Hz to further reduce distortions cause by the power line. The issues mentioned above, regarding reduced sample rates and tracking in six degrees of freedom may be addressed in the following discussion of the transmitter 14 and the method for tracking the transmitter. For example, an embodiment may include operating two coils of a transmitter 14 at the same frequency while shifting the phase and gain of each field to identify them. Further, as will be explained, an embodiment may include an arrangement of the coils of the transmitter 14 that are resistant to distortions.

To allow for tracking in six degrees of freedom (including "roll"), an embodiment may include a transmitter 14 that includes two coils. However, when implementing a two coil transmitter 12, the mutual inductance cross coupling between the two coils of the transmitter 12 permits the current in the first coil of the transmitter 12 to induce voltage in the second coil of the transmitter 12 (i.e., similar to induced current into a receiver coil). The result is a current flow in the second coil that is the same frequency as the current driven across the first coil. This unwanted current makes distinguishing two transmitter coils difficult, as the induced current in the second coil to the transmitter 12 may result in a magnetic field being produced from both coils with the same frequency and phase. To minimize the mutual inductance between the two coils of the transmitter 12 a technique of tilting the coils may be employed.

Figure 2:
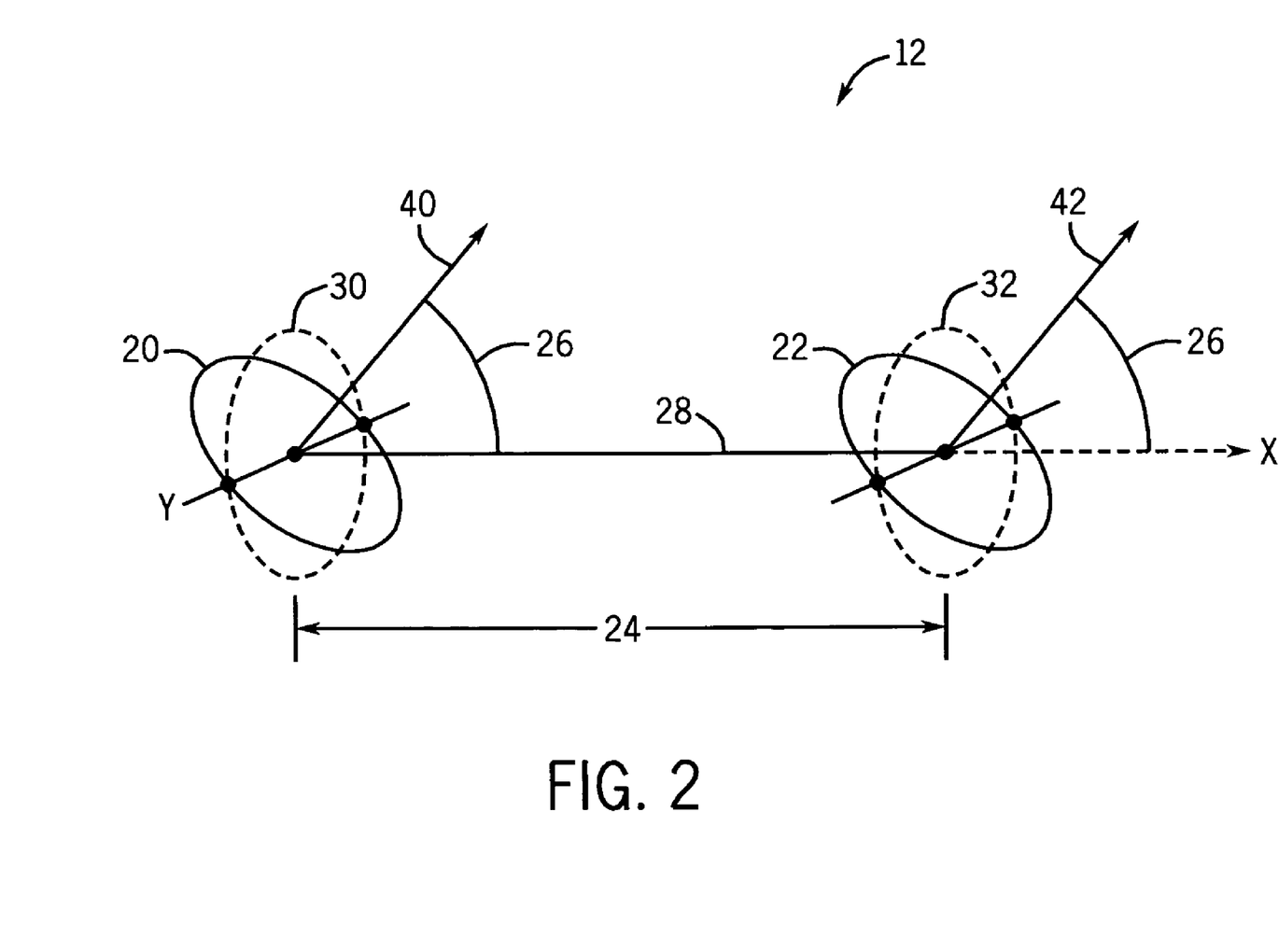
FIG. 2 is an illustration of a perspective view an exemplary coil arrangement in accordance with certain aspects of the present technique.
Figure 3:
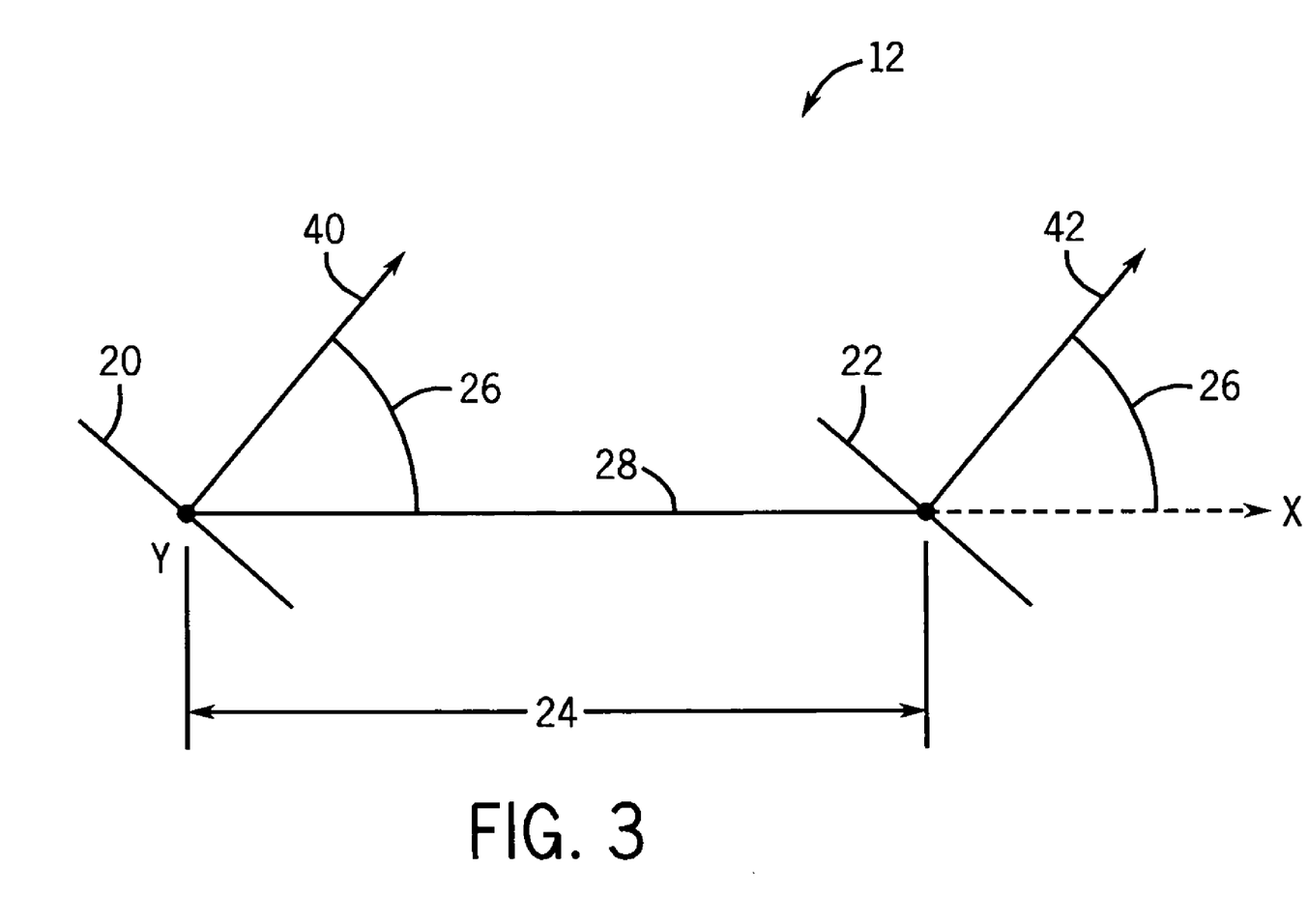
FIG. 3 is an illustration of a side view of the exemplary coil arrangement of FIG. 2 in accordance with certain aspects of the present technique.

Turning now to FIG. 2, depicted is a transmitter 12 including a first coil 20 and a second coil 22 that are tilted, for example, to minimize the mutual inductance between the two coils. In one embodiment, the center of the first coil 20 and the center of the second coil 22 may be separated by a separation distance 24. For example, the separation distance may be approximately 4 cm. Further, in one embodiment, the arrangement may include the first coil 20 and second coil 22 tilted at the same orientation relative to the separation vector 28 running from the center of the first coil 20 to the center of the second coil 22. For example, as depicted in FIGS. 2 and 3, the first coil 20 may be titled at a tilt angle 26 from the separation vector 28. As illustrated, the separation vector 28 may run along the axis of an untilted first coil 30 and to the axis of an untilted second coil 32 if the axis of the two coils were aligned. In the illustrated embodiment, the first coil 20 and the second coil 22 may have a first magnitude vector 40 and a second magnitude vector 42, respectively, when drive currents are supplied to the coils.

In an exemplary embodiment, the tilt angle 26 may be set to provide for reduced cross coupling as described above. For example, the tilt angle 26 may be approximately 54.7 degrees. In this embodiment, the mutual inductance cross coupling between the two coils is minimized and, thus, the interference due to each of the coils may be reduced. As will be appreciated by those of ordinary skill, the tilt angle 26 may be varied to accommodate numerous applications. For example, where the mutual inductance cross coupling is not a concern, the tilt angle 26 may range from 0 to 90 degrees to allow for the resolution of a roll orientation parameter. Or in other embodiments, a tilt angle 26 may be employed to minimize distortions of a specific system.

To arrange the first coil 20 and the second coil 22 at the tilt angle 26, the transmitter 12 having two coils may be rigidly supported. For example, the transmitter 12 may be enclosed in a housing that provides for mounting of the first coil 20 and the second coil 22.

Figure 4:
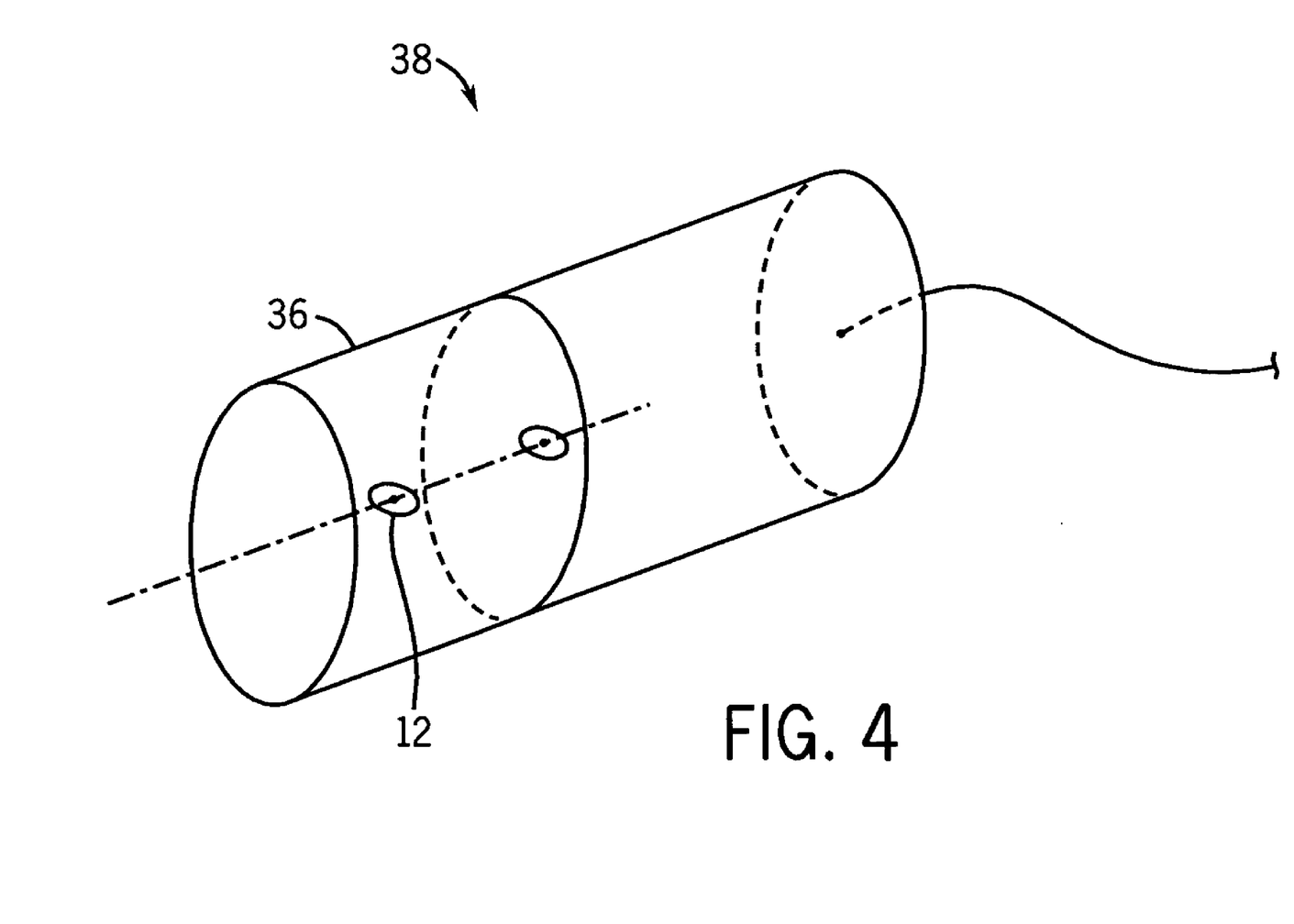
FIG. 4 is an illustration of the exemplary coil arrangement of FIGS. 2 and 3 mounted in an instrument in accordance with aspects of the present technique.

Turning now to FIG. 4, an illustration of the transmitter 12 of FIGS. 2 and 3 mounted in an instrument is provided, in accordance with aspects of the present technique. In the illustrated embodiment, the transmitter 12 includes the first coil 20 and the second coil 22 and is enclosed in a housing 34. As illustrated, the housing 34 may take the form of an enclosure coupled to the body 36 of the instrument 38. For example, as depicted, the transmitter 12 may be mounted in the operative end of the instrument 38. As will be appreciated by a person of ordinary skill in the art, the present technique may include coupling the transmitter 12 to various instruments 38 tracked during medical procedures. For example, the instrument 38 may include a catheter, a drill, a guide wire, an endoscope, a laparoscope, a biopsy needle, an ablation device or other similar devices.

As discussed previously, in a multi-coil transmitter (such as transmitter 12 having first coil 20 and second coil 22) processing may be employed to track each coil. To accomplish this, processing may need to distinguish each of the magnetic fields sensed by the at least one receiver 14. Thus, an embodiment may include drive currents supplied to each of the first coil 20 and the second coil 22. For example, each drive current may include an identifying characteristic to allow processing to distinguish which coil of the transmitter 12 is generating each of the sensed magnetic fields. In one embodiment, providing a current to induce a magnetic field may include driving both the first coil 20 and the second coil 22 at the same frequency, but out of phase. For example, the first coil 20 may be driven by a sine waveform current and the second coil 22 may be driven by a cosine waveform current. In this embodiment, the two current waveforms may have the same frequency with a phase offset of approximately ninety degrees. As will be appreciated by those skilled in the art, the waveforms driving the first coil 20 and the second coil 22 may include a phase offset that is not ninety degrees, but is suitable to allow processing to differentiate between the generated waveforms.

Although offsetting the phases of the waveforms provided to each coil of the transmitter 12 may provide for distinguishing the first coil 20 and the second coil 22, to aid in processing (as discussed in further detail below) it may be necessary to provide an additional distinguishing characteristic to each of the respective waveforms. This may be accomplished by increasing or decreasing the strength of the magnetic fields relative to one another. The strength of the magnetic field may be characterized by the magnitude of the magnetic field moment vector. The magnitude of the magnetic field moment vector may be increased or decreased by varying the amplitude of the drive current waveform. For example, the first coil 20 may be driven by a current waveform with a first amplitude and the second coil 22 may be driven by a current waveform of a second amplitude. In one embodiment, a modest ratio (e.g., 2:1 or less) of the first magnitude vector 40 to the second magnitude vector 42 (see FIGS. 2 and 3) could be used to distinguish the two magnetic fields and, thus, allow processing to distinguish the first coil 20 and the second coil 22. As will be appreciated by those of ordinary skill in the art, the ratio of the magnitude vectors may be varied to accommodate specific applications. For example, a larger ratio may be desirable in a system configured to detect and process signals of significantly different magnitudes or a smaller ratio may be desired for a system configured to detect and process signals of similar magnitudes.

As will be appreciated, EM tracking may be accomplished with a variety of configurations and combinations of the transmitter 12 and the at least one receiver 14. For example, the transmitter 12 may be configured to be used as a "wired" device or a "wireless" device. In an embodiment including a wired transmitter, the transmitter 12 may be electrically coupled to the processor 20 and, thus, coupled to the at least one receiver 14. In a wired configuration, the measured phases of the waveforms driving the first coil 20 and the second coil 22 may be known. For example, the source of the drive current waveforms may be embedded in the processor 20. Therefore, the processor 20 may "know" the phase that is driving the first coil 20 and the second coil 22 and, thus, may parse out each signal indicative of the given phases and frequencies from the combined signal sensed and transmitted by a receiver coil. With each of the phases identified and associated with each coil of the transmitter 12, the processor may implement any suitable algorithm(s) to establish the position and orientation of the transmitter 12 relative to the at least one receiver 14. For example, the processor may use the ratios of mutual inductance between each of the at least one receiver 14 and each coil of the transmitter 12 to triangulate the position of the first coil 20 and the second coil 22. The processor may use these relative positions to resolve a position and orientation of the transmitter 12.

Figure 5:
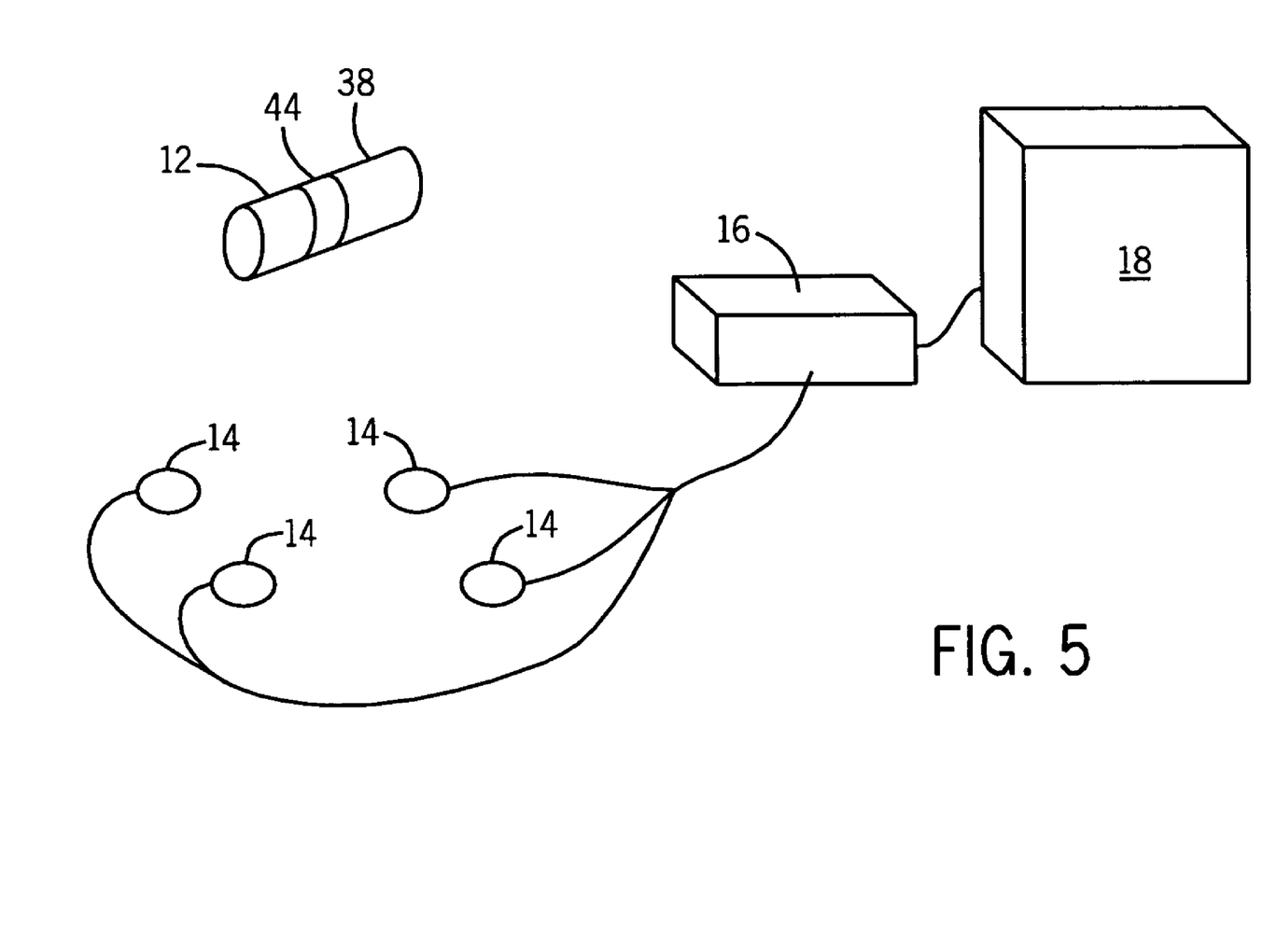
FIG. 5 is an illustration of the exemplary coil arrangement of FIGS. 2 and 3 in a wireless configuration in accordance with aspects of the present technique.

Although the phase of the waveforms driving the first coil 20 and the second coil 22 may be "known" in an embodiment where the transmitter 12 is wired, an embodiment including a wireless transmitter 12 may not have a "known" phase of the waveforms. For example, in an embodiment as depicted in FIG. 5, a wireless transmitter 12 may be driven by an independent current source that is coupled to the transmitter 12 and/or the instrument 38. In an embodiment, the current source may include an oscillator 44. In a configuration, the oscillator 44 may generate each of the current waveforms independent from the processor 20 (i.e., the processor does not have feedback or control relating to the phase of the two currents). For example, the transmitter 12 may be a standalone device that is generating magnetic fields independent of the processor 16. Thus, the processor 16 must incorporate additional considerations in processing to resolve the position and orientation of the transmitter 12 (e.g., identify the phases of the current waveforms generated across the first coil 20 and second coil 22 of the transmitter 12).

Processing in a "wireless" tracking system may include initial approximations and iterations to resolve a seed guess of position and orientation including the roll of the transmitter 12. An embodiment of processing may include: estimating a position and orientation (not including roll) from a combined signal, performing fitting algorithms to determine the two phases of the waveforms, determining two coil positions based on the waveforms at the given phases, identifying each respective coil based on the EM field magnitude, and finally resolving a position and orientation "seed guess" (including roll) based on the position of the two coils.

To determine an initial position estimate, processing may consider the combined signals sensed by the receiving coils. For example, an embodiment may include a transmitter 12 that includes a first coil 20 and second coil 22 with a separation distance 24 that is small compared to the tracking area of the at least one receiver 14. In this configuration, the mutual inductance sensed across each of the at least one receiver 14 may include a waveform indicative of a linear combination of the magnetic field mutual inductance generated by the first coil 20 and the second coil 22. This combined waveform may take on characteristics of a single coil generating a magnetic field from an average position with an averaged phase. Thus, processing may consider the received signal as a single waveform based on the addition of the signals generated by the first coil 20 and the second coil 22. As will be appreciated, any suitable from electromagnetic tracking processing may be used to estimate an averaged position and orientation based on this assumption. For example, processing may include triangulating the position of the transmitter 12 relative to the positions of the at least one receiver 14. In an embodiment where the first coil 20 and the second coil 22 have the same orientation (as discussed previously), an initial approximation of orientation (without roll) may yield an orientation (without roll) for both the first coil 20 and the second coil 22. As will be appreciated, the lack of a "roll" degree of freedom is because the averaged signal approximates the position of a single dipole coil, and therefore the "roll" orientation may not be resolved (as discussed previously). The "roll" orientation may be resolved in subsequent processing discussed below.

Further, the "combined waveform" sensed may provide for processing to determine an averaged phase. For discussion purposes, this phase may be referred to as the "seed phase" used as a starting point for subsequent processing. Given the averaged position, orientation and seed phase determined from the combined waveform, the processor 20 may continue processing to reach a "final seed guess" of position and orientation.

Although the "seed phase" may be determined from the combined waveform, the actual phase of each of the two magnetic fields may remain unknown at this point. An embodiment of processing may include an iterative approach to resolve the phases of the waveforms generated by first coil 20 and second coil 22 of the transmitter 12. For example, a suitable "Goodness-of-fit" calculation may be processed over a range of phases to identify the phases of the two waveforms that make up the combined waveform. The Goodness-of-fit ($G_f$) may include a dimensionless measure of the discrepancies between the modeled mutual inductance $L_{model}$ (which are functions of position estimates $R_{model}$ and orientation estimate $O_{model}$), and the measured mutual inductance $L_{meas}$ (for one transmitter coil and two receiver coils):

$$G_f = \frac{\sum_{r=1}^{2} (L_{model} - L_{meas})_r^2}{\sum_{r=1}^{2} (L_{meas})_r^2}$$

When $G_f$ is small, the remaining errors may be small, and thus the errors in R model and $O_{model}$ are small. If $G_f$ is high, then the approximate characteristics of the system are not correct. In light of these considerations, the iterative steps of determining the phases of the waveforms generated by the first and second coils, may include varying the phase in processing to estimate a position and orientation and using the Goodness-of-fit for refitting based in the new position and orientation at the varied phase. Initially, the combined phase may yield a poor goodness-of-fit, due to the sum of the transmitter coils not being representative of a dipole coil. The phase of the combined waveform may be varied in processing until the contribution from one coil is nulled. For example, the phase of the signal extracted in processing may be varied across a range of phases until the goodness of fit calculated indicates relatively small errors at two phases. These two "good fits" may indicate the two phases of the waveforms generated across one of the transmitter coils.

Next, the position and orientation of one coil may be determined by extracting the waveform of a first phase, and then fitting a position and orientation of one coil of the transmitter 12 relative to the one of the at least one receiver 14 using any suitable algorithm. Similarly, a waveform of the second phase may be extracted to fit the position and orientation of the other coil of the transmitter 12 relative to the one of the at least one receiver 14 using any suitable algorithm. At this point of processing, the position and orientation of the two coils may be known, although it is not known which is the position of the first coil 20 and which is the position of the second coil 22.

Additional considerations may be needed to identify the first coil 20 and the second coil 22 to fully resolve all six degrees of freedom (including roll). In one embodiment, the magnetic moments of each of the coils may be distinguished by the relative gain of each magnetic field. For example, as discussed previously, the magnetic moment of the first coil 20 and the second coil 22 may be of differing magnitudes (e.g., a ratio of 2:1). Thus, processing may include distinguishing the waveform at the first phase from the waveform at the second phase by comparing the amplitude of the waveforms received. For example, if waveform generated by the first coil 20 is a 25 Hz cosine waveform with an amplitude that is twice the amplitude of a 25 Hz sine wave waveform generated by the second coil 22, then processing may isolate each phase and amplitude to associate the two calculated positions to the first coil 20 and a calculated position of the second coil 22. Once the location of each coil has been established, orientation (including roll) may be resolved by processing using any suitable algorithm. For example, processing may include triangulating the position of each coil to determine the X, Y, Z, pitch, yaw, and roll of the transmitter 12 relative to the at least one receiver 14. Thus, tracking may be accomplished in six degrees of freedom using a low frequency drive current.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electromagnetic tracking system, comprising:
    a coil arrangement comprising a first coil configured to generate a first magnetic field and a second coil configured to generate a second magnetic field; and
    a drive unit configured to provide a first drive current to the first coil and to provide a second drive current to the second coil,
    wherein the first drive current and the second drive current are at about the same frequency, wherein the frequency is below 60 Hz, wherein the first magnetic field and the second magnetic field are generated out of phase, and wherein the first drive current comprises a sine wave current and the second drive current comprises a cosine wave current approximately 90 degrees out of phase with the drive current.

2. The electromagnetic tracking system of claim 1, wherein the first coil and the second coil are of the same orientation relative to a vector that connects a center of the first coil and a center of the second coil.

3. The electromagnetic tracking system of claim 1, wherein the first coil and the second coil are tilted at approximately 54.7 degrees from a vector that connects a center of the first coil and a center of the second coil.

4. The system for electromagnetic tracking of claim 1, wherein the magnitude of a moment of the first magnetic field is different from the magnitude of a moment of the second magnetic field.

5. The system for electromagnetic tracking of claim 4, wherein a ratio of the magnitude of the moment of the first magnetic field to the magnitude of the moment of the second magnetic field comprise an approximate range of 1.4 to 2.

6. The system for electromagnetic tracking of claim 1, comprising at least one receiver configured to receive the first magnetic field and the second magnetic field generated by the coil arrangement.

7. The system for electromagnetic tracking of claim 6, comprising a processor configured to determine a position and/or orientation of the first coil and the second coil based on the first magnetic field and the second magnetic field received by the at least one receiver.

8. The system for electromagnetic tracking of claim 1, wherein the coil arrangement is coupled to an instrument.

9. A method for electromagnetic tracking, comprising:
    driving a first current across a first coil to generate a first magnetic field;
    driving a second current across a second coil to generate a second magnetic field,
    wherein the first magnetic field and the second magnetic field are at about the same frequency, wherein the frequency is below 60 Hz, and wherein the first magnetic field is out of phase with the second magnetic field;
    sensing the first magnetic field and the second magnetic field with at least one electromagnetic receiver; and
    processing the sensed first magnetic field and the sensed second magnetic field, wherein processing the sensed first magnetic field and the sensed second magnetic field comprises determining a position and/or orientation of the first coil and/or the second coil relative to the at least one electromagnetic receivers.

10. The method of claim 9, wherein driving a first current comprises providing a sine waveform current and driving a second current comprises providing a cosine waveform current approximately 90 degrees out of phase with the first drive current.

11. The method of claim 9, wherein the first coil and the second coil are of the same orientation relative to a vector that connects a center of the first coil and a center of the second coil.

12. The method of claim 9, wherein the first coil and the second coil are tilted at an angle of approximately 54.7 degrees from a vector that connects a center of the first coil and a center of the second coil.

13. The method of claim 9, wherein the magnitude of a moment of the first magnetic field is different from the magnitude of a moment of the second magnetic field.

14. The method of claim 13, wherein a ratio of the magnitude of the moment of the first magnetic field to the magnitude of the moment of the second magnetic field comprise an approximate range of 1.4 to 2.

15. A method for electromagnetic tracking, comprising:
    driving a first current across a first coil to generate a first magnetic field;

driving a second current across a second coil to generate a second magnetic field, wherein the first magnetic field and the second magnetic field are at about the same frequency, wherein the frequency is below 60 Hz, and wherein the first magnetic field is out of phase with the second magnetic field;

sensing the first magnetic field and the second magnetic field with at least one electromagnetic receiver, wherein sensing the first magnetic field and the second magnetic field comprises measuring mutual inductance between the first coil and the at least one electromagnetic receiver, and measuring mutual inductance between the second coil and the at least one electromagnetic receiver; and processing the sensed first magnetic field and the sensed second magnetic field.

16. The method of claim 9, comprising positioning an instrument with respect to the at least one electromagnetic receiver, wherein the first coil and the second coil are coupled to the instrument.

* * * * *